July 19, 1966          R. C. BELL          3,262,105
CONDITION RESPONSIVE ELECTRICAL SYSTEM
Filed Jan. 3, 1961                    7 Sheets-Sheet 1
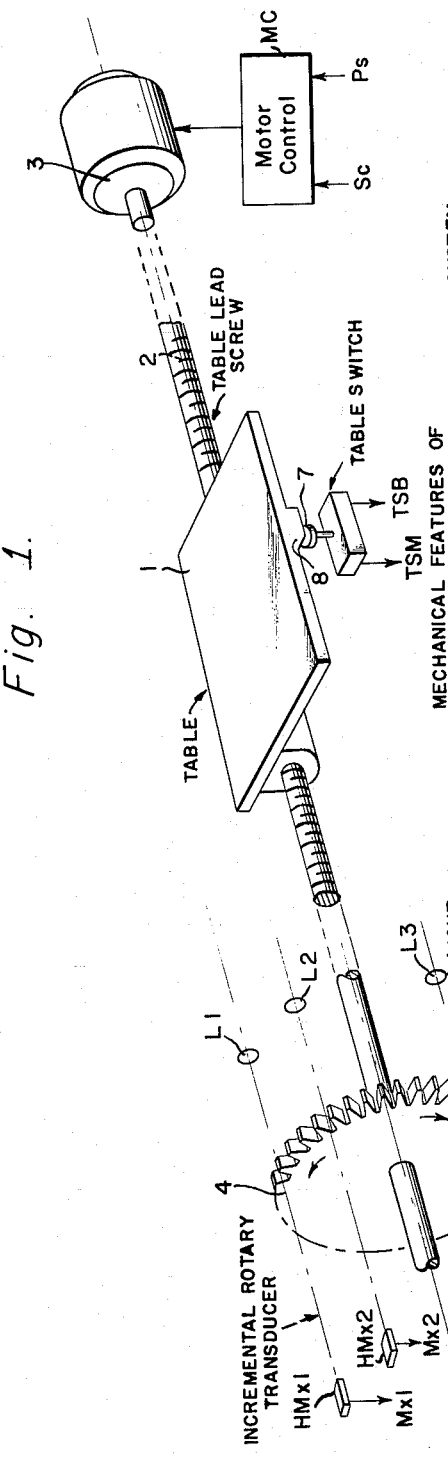
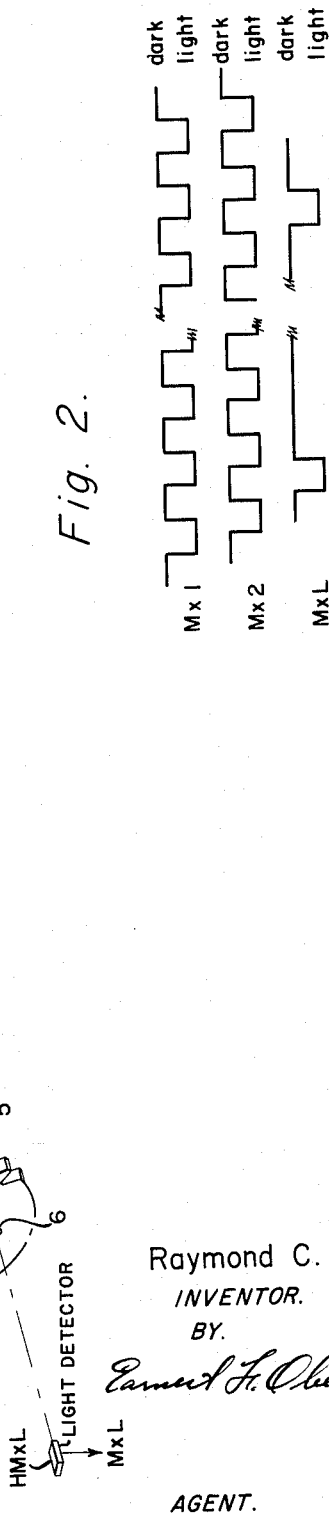
Raymond C. Bell,
INVENTOR.
BY.
Earnest F. Oberhein
AGENT.

July 19, 1966 R. C. BELL 3,262,105
CONDITION RESPONSIVE ELECTRICAL SYSTEM
Filed Jan. 3, 1961 7 Sheets-Sheet 2

POSITIONING SYSTEM

Raymond C. Bell,
INVENTOR.
BY
Ernest F. Oberlin
AGENT.

COUNT GENERATOR

July 19, 1966 R. C. BELL 3,262,105
CONDITION RESPONSIVE ELECTRICAL SYSTEM
Filed Jan. 3, 1961 7 Sheets-Sheet 5

ELECTRICAL OUTPUTS OF
POSITION MEASURING
CIRCUITS PM1 AND PM2

Raymond C. Bell
*INVENTOR.*
BY.

*AGENT.*

July 19, 1966  R. C. BELL  3,262,105
CONDITION RESPONSIVE ELECTRICAL SYSTEM
Filed Jan. 3, 1961  7 Sheets-Sheet 6

GATE 11, FLIP FLOP FQL AND TABLE SWITCH TS

TYPICAL COUNT GATE

Raymond C. Bell,
INVENTOR.
BY
AGENT

SYSTEM TIMING SIGNALS

United States Patent Office 3,262,105
Patented July 19, 1966

3,262,105
CONDITION RESPONSIVE ELECTRICAL SYSTEM
Raymond C. Bell, Los Angeles, Calif., assignor to Hughes Aircraft Company, Culver City, Calif., a corporation of Delaware
Filed Jan. 3, 1961, Ser. No. 80,485
5 Claims. (Cl. 340—203)

This invention relates generally to condition responsive electrical systems and more particularly to systems for detecting incremental displacements.

This invention utilizes a rotary type of incremental position transducer adapted to be rotated at the same speed as, or some speed proportional to, the rotation of a lead screw of a machine tool, for instance, under which circumstances each angular increment denotes a particular increment of pitch distance along the lead screw.

In regard to a system of this general arrangement, this invention is specifically concerned with an arrangement for establishing an absolute reference position with respect to the lead screw.

As will be apparent from the above, systems of this type are generally useful in sensing displacements in discrete steps, either in a linear sense or in an angular sense. In accomplishing this a scale graduated in predetermined scale divisions usually defines the discrete steps. Such a scale may be a linear scale, or it may be a scale marked circumferentially on the surface of a drum, or a scale formed about the surface of a disc, or formed by slots cut in the edge of a disc. In practice, an electrical detector arrangement capable of resolving the scale is supported adjacent the scale in operative relation thereto such that relative movement between the scale and detector results in the production of an electrical output by the detector as a result of some electrical change in the detector, say between two electrical states, as the detector traverses the scale.

The electrical output thus produced may be applied after shaping and amplifying, if needed, as input to a suitable type of counter which may be set to count up or to count down, as required, to provide a scale count indicating the total number of increments of the displacement which has occurred.

One type of incremental transducer which may be utilized in practicing this invention is described in U.S. Patent 2,848,698, entitled "Variable Reluctance Magnetic Devices," by C. K. Howey et al., and assigned to the assignee of this invention. This patent describes an electromagnetic transducer assembly employing a linear magnetic scale of magnetic material in which the scale divisions are formed by grooves with intermediate lands, each groove and adjacent land defining a full scale division, for instance. Elecromagnetic heads disposed in flux linkage with the scale are displaced an appropriate distance from each other along the scale path, in this instance, two heads are provided and each is equipped with a small pole face capable of resolving the scale divisions, that is, each pole face is capable of detecting a groove and a land. As a consequence, as the heads are displaced along the scale path defined by the grooves and the lands, each head varies between a condition of low magnetic reluctance over a groove and a condition of higher magnetic reluctance over a land, such that each head is effectively switched between two electrical impedance states as it advances across each scale division. The electrical output of each magnetic head as a function of displacement may be plotted ideally as a square wave, yielding a pair of phase displaced plots of the respective impedance changes.

The use of two heads in such a situation offers two advantages: one is the production of scale counts jointly by the heads representing a higher order resolution of the scale than the actual scale divisions; the other is that by noting the particular electrical configurations of the heads at one position on the scale during a particular interval of time, and in a second succeeding time interval with the heads displaced less than a scale division from said one position, again noting the electrical configuration of the heads, it is possible to determine the direction in which displacement occurred from said one position. The heads are so displaced relative to the scale so that only one of the heads changes electrical state with each increment of displacement. By this expedient, directivity is obtained.

Although magnetic heads resolving grooves in a scale are described in this connection, it will be appreciated that this arrangement is not limited to an organization utilizing magnetic heads. The principles herein discussed may be practiced with devices using photoelectric cells, for example, wherein a light beam impinging upon a photocell may be deflected or interrupted by well known expedients to achieve similar results.

According to one practical embodiment of the arrangements aforesaid utilizing two detector heads, the fixed relative displacement of the detector heads with respect to the scale divisions is an odd multiple of one-quarter scale divisions. For instance, if the heads are mounted in substantially side by side relationship the heads may be relatively displaced along the scale by one-fourth of a scale division, here termed an increment. For a scale having scale divisions of the order of 4 mils a scale count, or increment, again viewing the combined outputs of the heads, of the order of 1 mil may be obtained. With the heads so displaced directivity is achieved by noting the electrical state of the heads in any particular position, for example, in a position with both heads simultaneously over a groove or over a land, or with one head over a groove and with the other head over a land, or vice versa. For each of these conditions, the electrical state with an electrical increment of displacement in one direction or in the other direction from a given position may be determined. These electrical states are repetitive and as such form a pattern from which the direction of motion with respect to a preceding position is always indicated.

Displacement of the detector heads relating to the scale may be achieved by any suitable means. According to the present invention the scale is formed by a disc having a predetermined number of equally spaced teeth about its periphery. The disc for the purposes of this discussion is directly driven by a lead screw which is used to effect displacement of a machine element or table along a particular axis of freedom, the disc being mounted on the lead screw therefore rotates in a 1 to 1 relationship with the lead screw.

An arrangement of this type, it will be apparent, in one revolution is capable of providing discrete indications of increments of lead screw pitch. However, in view of the fact that the displacement of a particular machine element ordinarily involves more than one revolution of the lead screw, it is apparent that some means must be provided to establish a zero reference for lead screw revolutions. Stated otherwise the problem is one of defining a reference or a zero point for the pulse train produced by the detector heads which are used to resolve the circular scale.

In some arrangements this is accomplished with some success by utilizing code wheels with suitable coded indicia thereon such as binary or gray coded digits. However, even with such arrangements it is necessary to recognize the zero or reference revolution in order to establish an absolute reference for pulse counting. This requires at the very least the addition of a complicated logical circuit which recognizes the electrical signal configuration representative of the zero or reference revolution and produces an output signal used to initiate a counting cycle.

Accordingly, one object of this invention is to provide a rotary type of incremental position transducer system which is simple with respect to operational requirements and which is positive in operation.

Another object of this invention is to provide a rotary type of incremental position transducer system in which an absolute zero reference position is provided.

It is also an object of this invention to provide a rotary type of incremental position transducer system of the character aforesaid embodying provisions for determining the direction of specific displacements.

The aforesaid and other objects and advantages are accomplished according to the present invention in a position measuring system embodying a rotary type of incremental position transducer having electrical detectors producing electrical outputs in dependence upon incremental angular displacements and producing an electrical output in dependence upon each complete revolution of the rotary member of the transducer. The electrical outputs thus produced are applied to suitable electrical circuits capable of producing electrical outputs of such character and of such logical relationship as to provide a first group of increment pulses for rotation of the rotary member of the transducer in one direction and a second group of increment pulses for rotation of the rotary member of the transducer in the opposite direction, each increment pulse representing an increment of angular displacement as described above and, further, for producing a single pulse in correspondence with each complete revolution of the rotary member of the transducer. The single rotation pulse produced with each complete revolution of the rotary member of the transducer occupies a particular position in time with respect to the increment pulses and as such effects a control which occurs intermediate a selected pair of increment pulses.

A switch controlled by movement of the machine element from retracted position produces a reference signal which is combined with said rotation signal in the input to suitable pulse counting circuits to enable said circuits, at a particular instant of time determined by said single rotation pulse or signal, to begin counting the increment pulses. By this expedient an absolute reference is provided from which all counting of increments of displacement occurs.

The aforesaid and other objects and advantages will be more apparent from a study of the following specification when considered in conjunction with the accompanying drawings in which:

FIG. 1 is a perspective illustration fragmentarily depicting the mechanical organization of the rotary transducer system of this invention;

FIG. 2 is a graph depicting the electrical outputs of the respective detector heads of the rotary transducer, ideally as square waves, showing the approximate time-phase relationship of the electrical states of the heads;

Figure 3:
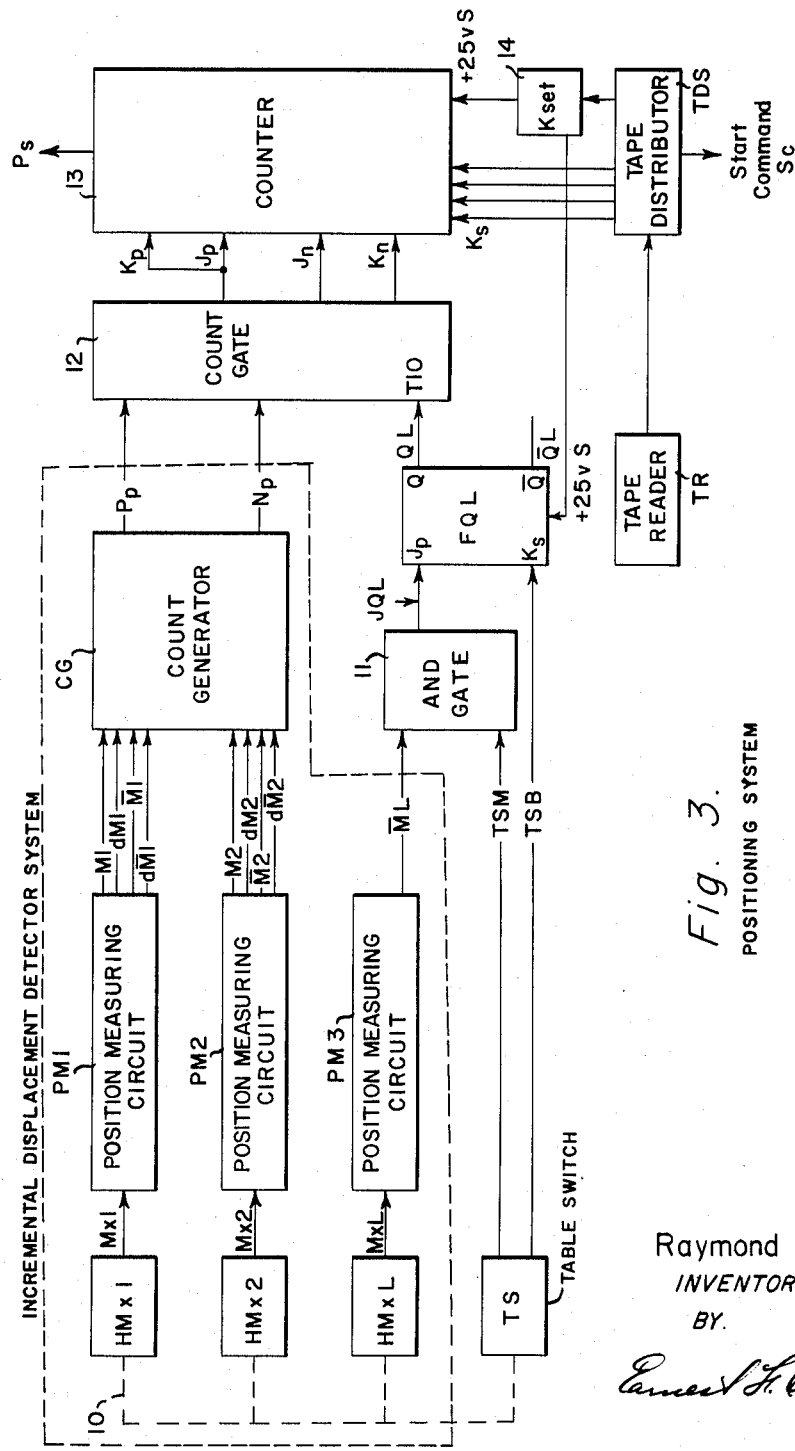
FIG. 3 is a block diagram generally illustrating the electrical aspects of this invention.

With reference to FIG. 1, for the purpose of this invention, it may be assumed that the movement of a machine tool table from a particular position is to be indicated in terms of increments of displacement along a given path. Such a machine tool table is schematically illustrated in FIG. 1 and designated 1. Machine tool table 1 is powered by a lead screw 2 rotated by a motor 3 such as an electric motor, for instance, controlled by any suitable motor control circuit represented by block MC and controlled by start command signals $S_c$ and position signals $P_s$, as later described. A disc 4 which is slotted circumferentially to provide equally spaced teeth 5, is connected to and driven by lead screw 2, in 1 to 1 relationship. An aperture 6 is provided in the disc 4. Disc 4 constitutes the rotor of a rotary type of incremental position transducer including, additionally, detector heads HM$x$1, HM$x$2 and HM$x$L together with respective light sources L1, L2 and L3. The detector heads HM$x$1 and HM$x$2 together with respective light sources L1 and L2 are disposed such that the teeth 5 in the periphery of the disc 4 interrupt the light beams impinging upon the detector heads HM$x$1 and HM$x$2. Additionally, the heads HM$x$1 and HM$x$2 and their respective light sources L1 and L2 are so disposed relative to the teeth in the disc 4 that with each quarter scale division of angular displacement, that is, each increment, only one of the detector heads at a time will change electrical characteristic. As discussed earlier herein for the arrangement involving two heads this physical displacement will be an odd multiple of quarter scale divisions, a scale division being defined as the distance between any two corresponding points on adjacent teeth 5. The aperture 6 controlling irradiation of detector head HM$x$L by light source L3, is disposed so that an electrical change in the detector head HM$x$L resulting from illumination by light occurs during an interval of time in which both of detector heads HM$x$1 and HM$x$2 are illuminated by light or vice versa. Stated otherwise, the brief change in electrical state of detector head HM$x$L occurs during an interval when both detector heads HM$x$1 and HM$x$2 are in stable electrical states and regardless of the relative sensing of the electrical states.

The phase relationship of these electrical characteristics, ideally depicted as square waves in the interest of convenience, appears in FIG. 2. Here it will be seen that the electrical change or output M$x$2 of detector head HM$x$2 lags the output M$x$1 of detector head HM$x$1 by 90 electrical degrees. This results from the physical relationship of the detector heads and light sources, respectively, with respect to the teeth 5 of the disc 4 for a particular direction of rotation as described above. The electrical change or output M$x$L of detector head HM$x$L, which occurs once each revolution, occurs in part during that period of time in which the electrical outputs M$x$1 and M$x$2 occur. No attempt has been made in this discussion to indicate the electrical values of the electrical outputs M$x$1, M$x$2 and M$x$L, it merely being shown that these electrical outputs, representing electrical characteristics, change between two electrical states.

The detector heads for the purposes of this discussion may be suitable photoconductive semiconductor devices, such as silicon diodes, which change in electrical resistance from one value of electrical resistance (dark) to a lower value of electrical resistance (light). As such the curves shown in FIG. 2 may depict the change in electrical resistance of the detector heads, assuming such heads to be photosensitive types as described. If magnetic heads are employed the curves may then represent the change in reluctance of the heads or may depict the inductance or impedance of the electrical circuit including the coils on the heads.

A reference position for the machine table 2 is determined by means of a table actuated switch, generally designated TS. The details of this switch are not shown but such switch may be of conventional spring loaded, double pole, double throw type, including an actuating lever 7 controlled by a cam or projection 8 which is mounted on the table. Signal TSM may be regarded as a two-level signal existing in its low level or negative voltage state when the switch is actuated by the cam. Signal TSB is also a two-level signal existing in its low level or negative voltage state when the switch is off the cam.

The general arrangement of this position measuring system is depicted in the block diagram of FIG. 3. Here the respective detector heads are represented by blocks designated HMx1, HMx2 and HMxL. Dotted line 10 interconnecting these heads and switch TS represents the physical interrelation of the table switch and the heads, represented in FIG. 1, for instance, in the table and table drive, and the disc 4 which latter interacts with all the detector heads. The outputs Mx1, Mx2 and MxL of the respective detector heads are applied as inputs to respective position measuring circuits designated PM1 through PM3. Position measuring circuits PM1 through PM3, while functioning as amplifiers as will be explained hereinafter, each also include circuits for complementing or inverting the respective amplified input signals and additionally include circuits for differentiating the amplified input signal and its complement. Whence, for the circuit PM1, the electrical outputs are M1, d(M1), $\overline{M1}$ and $d(\overline{M1})$, similarly for circuit PM2 the electrical outputs are M2, d(M2), $\overline{M2}$ and $d(\overline{M2})$. For the purpose of this discussion the circuit PM3 may be assumed to be the same as circuits PM1 and PM2. However, in regard to this portion of the discussion only the complemented or inverted signal $\overline{ML}$ of the output signals available, is employed in this invention. As described in connection with FIG. 2 it will be understood that the signals M1, M2 and $\overline{ML}$ bear the same physical relationship as those depicted in FIG. 2 insofar as their timing is concerned, (in this connection see FIGS. 6 and 7) with the exception that the signal $\overline{ML}$ is inverted with respect to the signal MxL, for instance, depicted in FIG. 2, to be normally at $-2$ volts (photocell dark), swinging in a positive direction to zero volts once each revolution, providing a high level signal during part of the period when both M1 and M2 are in their high level voltage states.

The portions of the circuit described herein for producing the respective output signals $P_p$ and $N_p$ representing pulse counts for positive and negative directions, respectively, of machine table movement, are described in detail in a copending application (now abandoned) Ser. No. 850,435, entitled "Condition Responsive Electrical System," Melvin R. McElroy, inventor, filed Nov. 2, 1959, and assigned to the assignee of this invention. Only such details of this application will be reproduced herein as are essential to an understanding of this invention. Further details may be had by reference to said application.

The electrical outputs of the respective position measuring circuits PM1, PM2 are applied as inputs to a count generator circuit generally designated CG. As will be explained hereinafter with reference to FIG. 5 and also with reference to FIGS. 6 and 7, this circuit receives the input signals shown and combines them in a particular logical interrelationship to produce electrical outputs $P_p$ for table movement in an assigned positive direction and electrical pulses $N_p$ for table movement in the opposite or negative direction. In some applications, for instance, when the heads HMx1 and HMx2 are associated with a linear scale which affords a zero reference, the positive or negative pulses as they are generated may be applied to a suitable counter circuit. In the present application, however, by reason of the use of an endless or circular scale, provision must be made for establishing a zero or reference position from which pulse counting may occur. As indicated, the incremental rotary transducer, the position measuring circuits and the count generator may be identified as an incremental displacement detector.

As shown in FIG. 3 pulse counting is inhibited until a precise machine table position is reached, by logically combining a pair of electrical signals $\overline{ML}$ and TSM (see signal timing diagram FIG. 9), which are controlled by detector head HMxL and switch TS respectively. Signal TSM is a two-level signal switching between some predetermined negative value (switch actuated) and some higher value when the switch is released. Signal $\overline{ML}$ is normally 2 volts negative and, once each revolution when aperture 6 passes the light beam, illuminating head HMxL with light, signal $\overline{ML}$ is switched in a positive going direction to some higher voltage level, say about zero volts.

AND gate 11 which controls the setting of flip-flop FQL, which in turn inhibits or permits pulse counting, is controlled by rising voltages at each of its two inputs, to produce a rising output voltage or signal JQL applicable to terminal $J_p$ of the flip-flop FQL. Initially with the table in its reference position and switch TS actuated, signal TSM is at its low level state. In this circumstance, signal TSM being continuously low, AND gate 11 is not enabled even though signal $\overline{ML}$ may switch to its higher level once each revolution. Signal JQL now being low and signal TSB now being high results in inputs at terminals $J_p$ and $K_s$ respectively, setting flip-flop FQL in its false or zero representing electrical state.

As will be explained hereinafter count gate 12 is controlled by negative going voltages. In its false state the electrical output signal QL of the flip-flop FQL is approximately zero volts. Under these conditions, count gate 12 is closed, inhibiting either set of count pulses $P_p$ or $N_p$. In its true or "1" representing electrical state the electrical output QL of flip-flop FQL is about $-2$ volts. This voltage enables count gate 12 and permits passing of either pulses $P_p$ or $N_p$.

When the machine table moves out of reference position and the limit switch is released electrical signal TSB changes electrical state. This signal which is effectively high when signal TSM is low and vice versa is now a negative signal and is applied to the K side of the flip-flop FQL at input terminal $K_s$. This is insufficient to trigger the flip-flop, however, which remains in its false or "0" representing electrical state as long as the signal $\overline{ML}$ exists in its low electrical state. When the aperture 6 in disc 4 sweeps through the light beam, signal $\overline{ML}$ momentarily rises. At this time the electrical input JQL at terminal $J_p$ on the flip-flop FQL rises. These combined biases trigger the flip-flop from its false or "0" representing electrical state to its true or "1" representing electrical state in which the output signal QL at terminal Q is low. At this time the count gate 12 is enabled and either the pulses $P_p$ or $N_p$ are applied to the $J_p$, $K_p$ or $J_n$, $K_n$ terminals, respectively, of counter 13.

The counter which comprises a plurality of cascaded flip-flops interconnected for count down operation, by application to the least significant flip-flop of signals $P_p$ or $P_n$, is initially set so that all flip-flops thereof are in "1" representing electrical states. A control signal produced by a relay 14 controlled by a tape distributor switch TDS which is stepped in synchronism with a tape reader TR, produces this "1" setting control signal. Relay 14 is also instrumental in initially setting flip-flop FQL in its true or "1" representing electrical state. This setting, however, is immediately changed as a consequence of the character of signals $\overline{ML}$ and TSM when the machine table is retracted, TSM then being negative inhibits AND gate 11.

Tape reader TR may be of any suitable type adapted to read a line of coded information at a time to provide coded instructions applied through the tape distributor switch TDS to the counter, subsequent to setting of the counter by relay 14, to provide a counter configuration representative of a particular dimension or, of a distance, which the machine table is to move. Additionally, the tape may include machine control signals which are applied directly to the machine to control auxiliary functions such as coolant flow. The tape may also include an "end of message" signal or start command signal $S_c$ which indicates that a particular block of tape has been completely read. This signal $S_c$ may be applied directly to the motor control circuits MC (FIG. 1) along with any other signals such as counter output position signal $P_s$ that may be necessary to initiate operation of the machine table.

Figure 4:
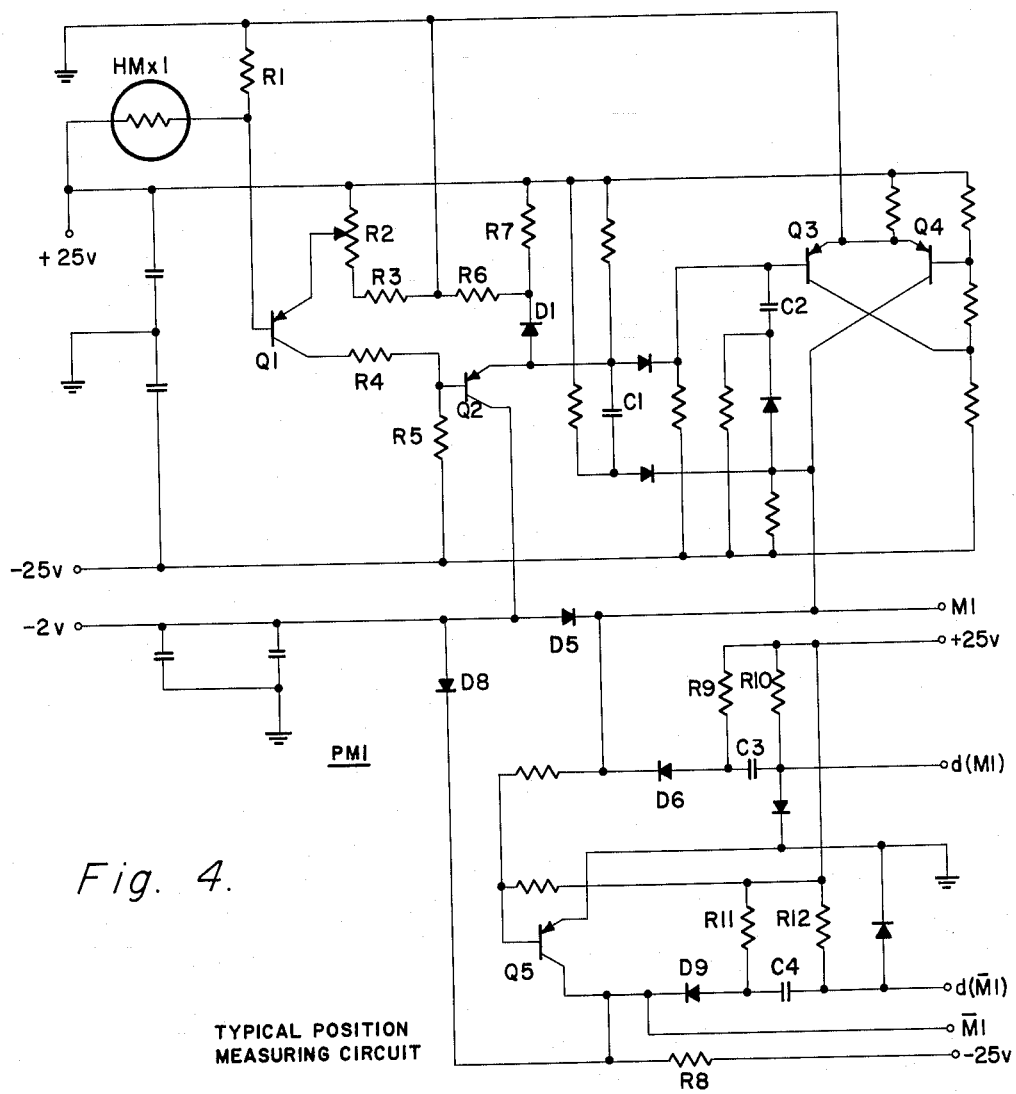
FIG. 4 is an electrical circuit diagrammatically illustrating the details of one of the position measuring circuits employed in this invention.

The position measuring circuits PM1 to PM3 illustrated in FIG. 3 may be identical and are typically represented in the circuit of FIG. 4 which is particularly associated with the circuit PM1 for the purpose of discussion only. All of the transistors in this circuit are of the p-n-p type. The circuit includes a two-stage amplifier comprising a pair of transistors Q1 and Q2 in the first and second amplifier stages respectively. The emitter bias is determined by means of an adjustable tap on a potentiometer R2 forming part of a voltage divider network including a resistor R3 connected between +25 volts and ground. The collector is connected to a −25 volt supply through suitable series resistors R4 and R5 the common terminal of which is connected to the base of transistor Q2. The base of transistor Q1 is controlled in a circuit including a photodetector HM$x$1, here diagrammatically represented as a photoresistive device, and a resistor in series therewith connected between +25 volts and ground. Since the resistance or impedance of the photodetector HM$x$1 varies, being low when light and higher when dark, the voltage which is applied to the base of transistor Q1 is correspondingly varied. This drives the transistor between cutoff (light) and saturation (dark). Suitable adjustment of the tap on potentiometer R2 produces a square wave output. The signal thus generated is further amplified and inverted by transistor Q2, the collector of which is connected directly to −2 volts and the emmiter of which is connected to a suitable point between resistors R6 and R7, by a diode D1, in a voltage divider connected between +25 volts and ground.

The output of transistor Q2 is applied to a transistor Q3 forming part of a trigger circuit including a transistor Q4. The signal from the second stage of the transistor amplifier is applied to the base of transistor Q3 through a delay network including among other elements, the capacitors C1 and C2, the delay network being so arranged as to control the trigger rate of the trigger circuit. The transistors of the trigger circuit are connected in common emitter configuration, the collector circuit in transistor Q4 being used as the output circuit of the trigger and providing the output signal M1. A clamping diode designated D5 which is connected to a point of −2 volts potential, clamps the output or collector circuit of trigger transistor Q4 to prevent voltage excursions below −2 volts. The upper excursion of the collector circuit voltage, occurring as a result of conduction of transistor Q4, is of the order of zero volts potential. When head HM$x$1 is dark, the base bias on transistor Q4 causes the transistor to conduct and terminal M1 is at about zero volts. The base bias on transistor Q3 is now positive, transistor Q2 being cut off since transistor Q1 is conducting. When HM$x$1 is illuminated, transistor Q1 is cut off, transistor Q2 conducts and simultaneously the base voltage of transistor Q3 drops initiating conduction and cutting off transistor Q4. Terminal M1 is now clamped at −2 volts.

The output signal M1 is inverted by means of an amplifier inverter including a transistor Q5. The emitter of transistor Q5 is grounded and the collector is connected through a resistor R8 to a −25 volt source of potential. The negative excursion of collector voltage is clamped at −2 volts by means of a clamping diode D8. The output of the collector circuit is the signal $\overline{M1}$.

Respective differentiating circuits including respectively, capacitor C3, resistors R9 and R10, and capacitor C4, resistors R11 and R12, are connected, respectively, in the output circuits of the trigger circuit and the amplifier inverter and respectively produce output signals $d(M1)$ and $d(\overline{M1})$. Thus, the circuits producing the respective signals indicated as the outputs of the position measuring circuit PM1 in FIG. 3 are particularly identified in FIG. 4. A similar circuit is required in connection with position measuring circuit PM2 in FIG. 3, photodetector HM$x$2 being substituted for photodetector HM$x$1. Similarly, a circuit as illustrated in FIG. 4 may be utilized as the position measuring circuit PM3 with detector head HM$x$L connected in place of head HM$x$1 shown in FIG. 4. In this instance $\overline{ML}$ will be taken from the output connection $\overline{M1}$ shown in FIG. 4.

The count generator circuit illustrated in FIG. 3 receives all of the input signals from the position measuring circuits PM1 and PM2 and combines them in a particular logical interrelationship to produce a series of pulses $P_p$ or $N_p$, as described, for each increment of movement of the machine table in positive or negative directions respectively.

Figure 6:
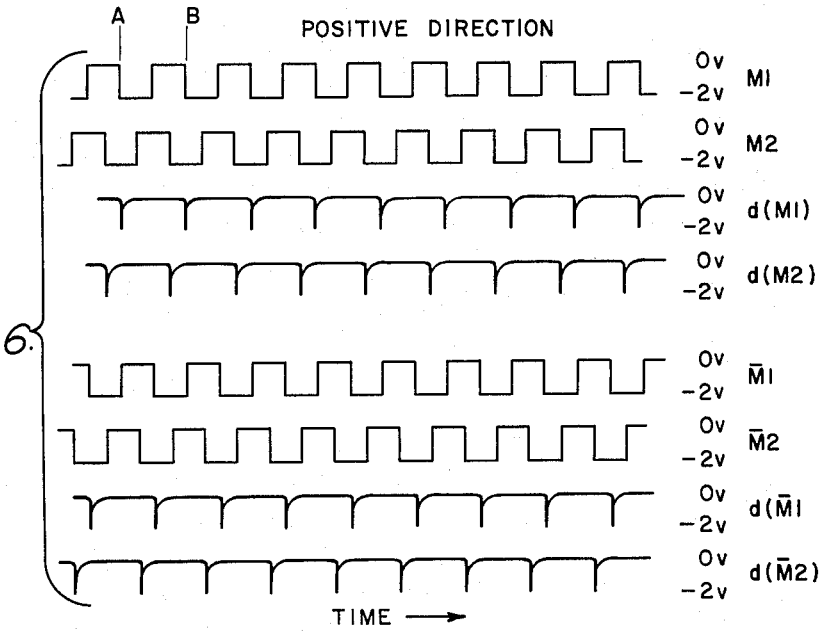
FIGS. 6 and 7 are timing diagrams of electrical signals produced by the position measuring electrical circuits, for positive and negative angular displacements of the rotary member of the transducer relative to the detector heads.
Figure 7:
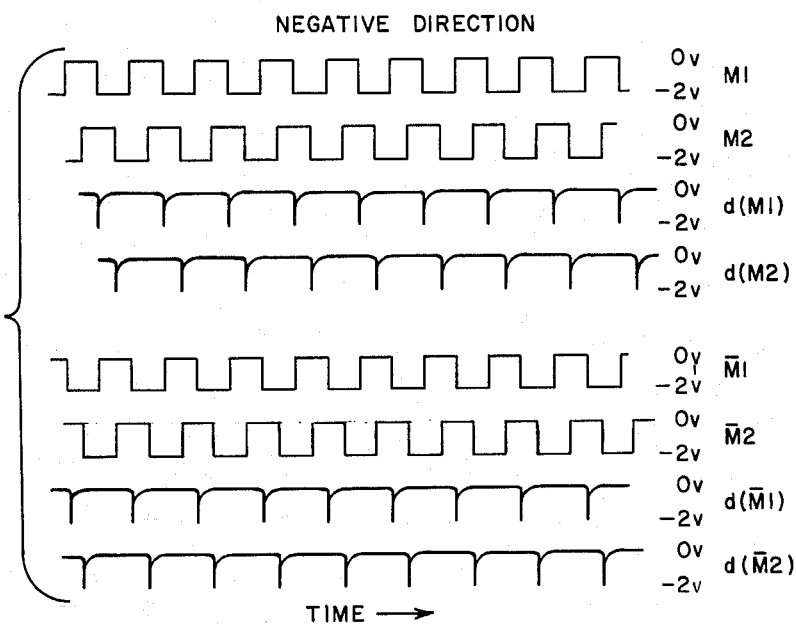

FIGS. 6 and 7 are signal timing diagrams illustrating the relationship of all of the signals for positive and negative directions of movement respectively. All of the signals therein illustrated are shown as switching between 0 volts and −2 volts, respectively. In this connection, it may again be noted with regard to the flip-flops utilized herein to produce voltage state signals, that the output of each Q terminal is true when that terminal is at −2 volts and false when that terminal is at 0 volts potential. In FIG. 6 the distance A to B represents one full electrical cycle; that is, the distance between two corresponding adjacent points on the square wave M1 represents one full scale division on the toothed disc 4, which may also be described as the distance between two corresponding adjacent points on the teeth 5.

By reference to FIG. 6, which shows the relationships of the various electrical signals for displacement of the machine table in an arbitrarily chosen positive direction, it will be seen that the condition for count pulse generation for displacement in the positive direction may be defined. These conditions simply require the gating of the negative voltage pulses with the simultaneously existing negative voltage states of signals M1, M2, $\overline{M1}$ and $\overline{M2}$. Thus, for instance, with reference to FIG. 6, the negative pulse $d(M1)$ always occurs during the negative voltage state of M2. Thus, a condition for positive count pulse generation may be defined by the following logical expression $$d(M1).M2+d(\overline{M1}).\overline{M2}+d(M2).\overline{M1}+d(\overline{M2}).M1$$

These four conditions describe the complete logical relationship of the voltage state and voltage pulse signals for the positive direction pulses $P_p$. By applying the same reasoning to FIG. 7 an expression may be written combining the simultaneously existing voltage state and voltage pulse signals in FIG. 7, for pulse generation in the negative direction as follows:

$$d(M1).\overline{M2}+d(M2).M1+d(\overline{M2}).\overline{M1}+d(\overline{M1}).M2$$

Figure 5:
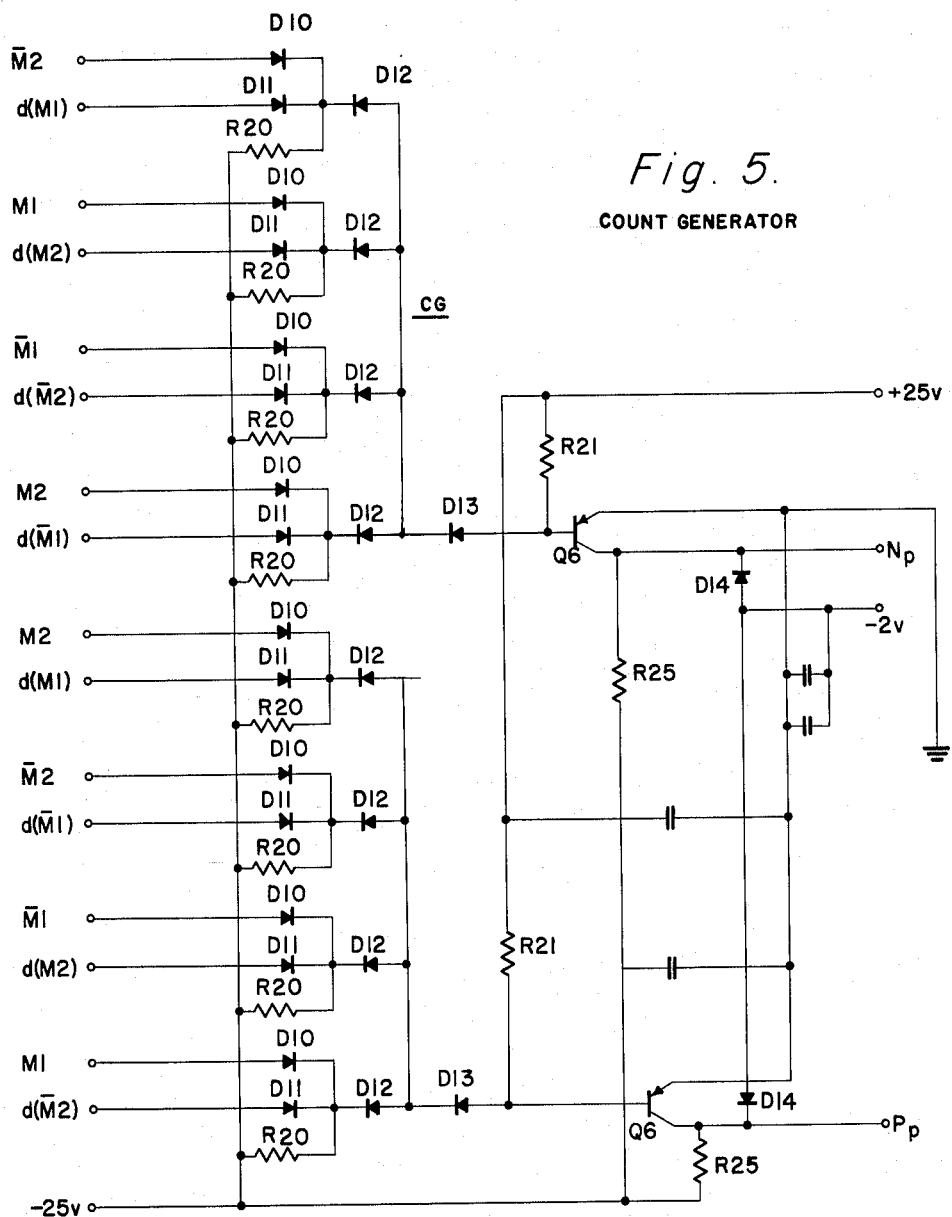
FIG. 5 is an electrical circuit diagrammatically illustrating the electrical details of a count generator circuit employed in this invention.

The circuit defined by these expressions involves a 2-level gate network depicted in FIG. 5. The gate is comprised of two sections. The positive pulse count section, which is the lower section, includes four AND gates, the outputs of which are coupled to an OR gate, the output of which in turn is applied as a base bias voltage to a transistor Q6, the collector circuit of which produces the positive direction pulse signals designated $P_p$. The upper section of this gate also comprises four AND gates applied as inputs to a single OR gate, the output of which drives a second (the upper) transistor Q6, the collector circuit of which produces the output pulses $N_p$. Each AND gate includes diodes D10 and D11 and a pull-down resistor R20 which is connected to −25 volts as indicated. Each OR gate is comprised of a pull-up resistor R21, a diode D13 and polarizing diodes D12. The output of each OR gate is coupled through a diode D13, in each instance, to the base of that transistor Q6 which is connected thereto.

Referring to the lower section of the count generator gate network, with the simultaneous occurrence of any of the negative pairs of voltage state and voltage pulse signals indicated, for instance, signals M2 and $d(M1)$, the output of that AND gate applied to the connected diode D12, drops to about −2 volts. This drop in voltage from a higher initial value, say, of approximately zero volts, swings the base of the lower transistor Q6 negative with respect to the emitter, by reason of the connection of the emitter of this transistor to ground and the collector to a potential of −25 volts through a suitable resistor. It will be seen that this negative excursion in base potential drives the transistor to conduction producing a pulse $P_p$. Similar considerations apply to any of the other gate circuits in this lower section as well as to all of the gate circuits in the upper section, the function of the circuits being identical. The requirement for count generation of particular positive direction or negative direction pulses is determined by the logical interrelationship of the respective negative going voltage pulses and voltage state signals, as described. The lower potential of pulses $P_p$ (or $N_p$) is −2 volts provided by diode clamps D14. The upper potential is approximately ground or zero volts.

Further details concerning this aspect of this invention may be had by reference to application Serial No. 850,435 identified hereinabove.

The flip-flops used in the position circuits described herein are all of the same general type. This includes the flip-flop FQL and the flip-flops employed in counter 13. Such a flip-flop is diagrammatically illustrated in FIG. 8. The flip-flop includes a pair of transistors Q11 and Q12 connected in grounded emitter configuration. The base of transistor Q11 and the collector of transistor Q12 are connected in a voltage divider circuit between +25 volts and −25 volts as shown and including the series connected resistors R22, R23 and R24. Similarly, the base of transistor Q12 and the collector of transistor Q11 are connected to a voltage divider network between +25 volts and −25 volts including series connected resistors R25, R26 and R27. Resistors R23 and R26 are respectively shunted by capacitors C6 and C7. Resistor R23, capacitor C6 and resistor R26, capacitor C7 constituting respectively the cross coupling circuits connecting the collector of one transistor to the base of the other transistor to provide fast triggering. The base circuits of the transistors are respectively provided with steering voltage connections to provide switching of the flip-flop from one electrical state to the other without uncertainty. These respective circuits include resistor R28, diode D14 and resistor R29, diode D15 in series between the collector and base of transistor Q11 and the collector and base of transistor Q12 respectively. J input signals at terminals $J_p$ or $J_n$ are applied to the base of transistor Q12 through a coupling capacitor C8 and the diode D15 while K input signals at terminals $K_p$ or $K_n$ are applied to the base of transistor Q11 through a coupling capacitor C9 and the diode D14. Setting signal voltages are applied to terminal $K_s$ which is connected directly to the base of transistor Q11. Clamping diodes D16 and D17 are provided respectively at the collector circuits to apply −2 volts clamping voltages as indicated, such that when either transistor Q11 or Q12 is not conducting the associated collector circuit will be clamped at −2 volts.

As earlier described herein the true state of the flip-flop is the −2 volt state at collector terminal Q and the false state is an approximate 0 voltage condition at terminal $\bar{Q}$. For the flip-flop to be in its true or "1" representing electrical state therefore, transistor Q11 is conducting and transistor Q12 is nonconducting. Under this condition terminal Q is at −2 volts as determined by the voltage clamp at diode D16, whereas as a consequence of current flow in the collector circuit of transistor Q11 including resistor R27, the $\bar{Q}$ terminal of the flip-flop will be at approximately 0 volts in which case diode D17 is back biased.

The flip-flop is triggered between its two electrical states by cutting of the conducting transistor by the application of positive voltage to the base. The steering voltages applied by the steering voltage circuits including resistors R28 and R29, as described hereinabove, permit control of the flip-flop by the simultaneous application of positive going voltage pulses to both terminals $J_p$ and $K_p$, for instance, or to both terminals $J_n$ and $K_n$, for instance, corresponding by way of example, to pulses $P_p$ simultaneously on terminals $J_p$ and $K_p$ or pulses $N_p$ on terminals $J_n$ and $K_n$ simultaneously, through the count gate 12.

An additional provision is made for setting the flip-flop in its "1" representing electrical state or its "0" representing electrical state. This resides in a suitable control of voltage +25 $vS$ or +25 $vR$, in a circuit such as controlled by a relay 14 (see FIG. 3) which may be connected to apply a strong negative bias momentarily to the base of either transistor Q11 or transistor Q12.

In the instant application the setting of each flip-flop of counter 13 in its "1" representing electrical state is desired prior to the time that the dimension signals read from the tape are applied to the terminal $K_s$. This is accomplished by a relay such as the relay 14 including a normally closed contact 14a and a normally open contact 14b. The coil of relay 14 is momentarily energized by tape distributor switch TDS reader prior to the time that the dimensional information is read from the tape. When energized, contacts 14a are opened. This disconnects terminal +25 $vS$ from the 25 volt supply indicated. After contacts 14a are opened contacts 14b close connecting terminal +25 $vS$ to a source of negative voltage, effectively of about −35 volts. This pulls the base of transistor Q11 strongly negative and forces the transistor Q11 to begin conducting, if it is not already conducting. Assuming that transistor Q12 were conducting, by forcing conduction of transistor Q11, the flip-flop is forced to change its electrical state. This results from coupling of the collector voltage of transistor Q11 to the base of transistor Q12 through the cross coupling circuits including resistor R26 and capacitor C7. When transistor Q12 is cut off, terminal Q is clamped at −2 volts and terminal $\bar{Q}$ is approximately at 0 volts, which is the true or "1" representing electrical state of the flip-flop circuit.

Figure 8:
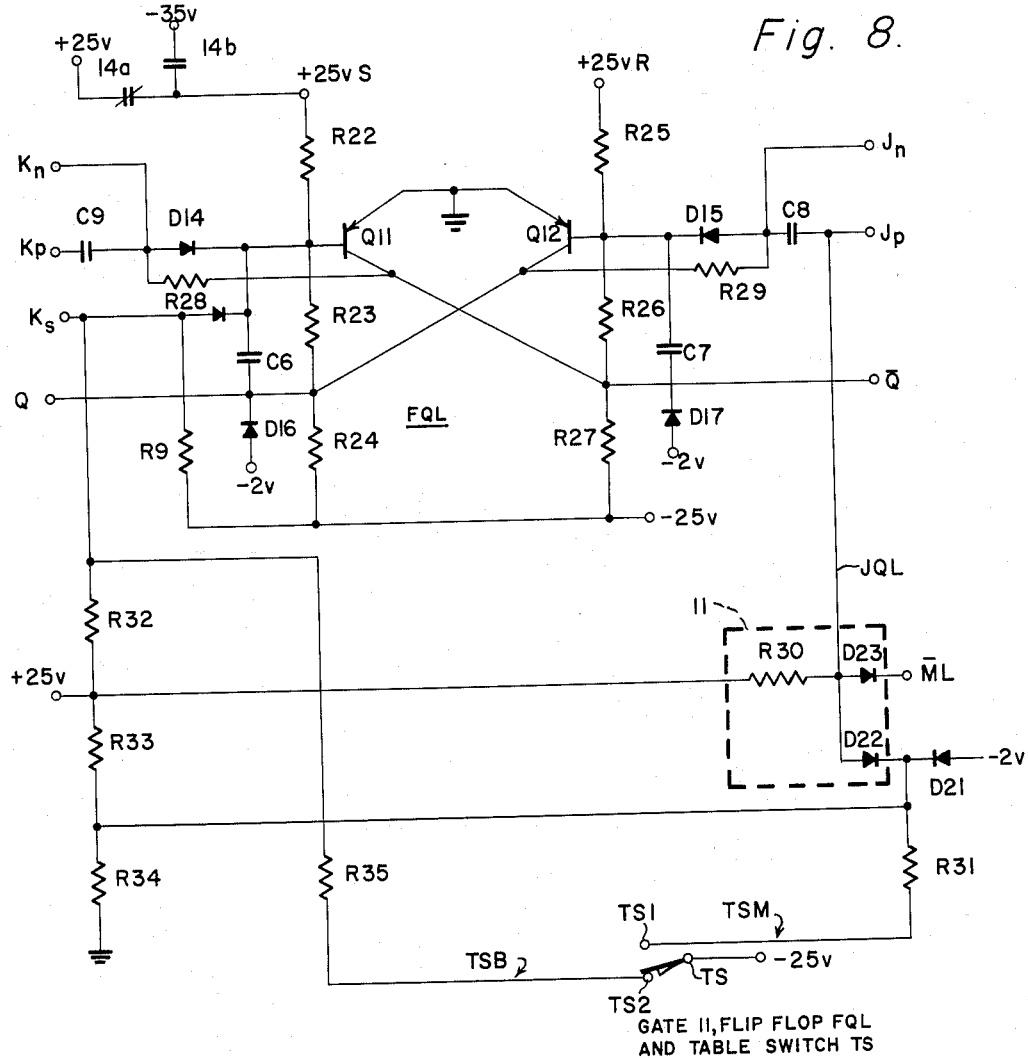
FIG. 8 is an electrical circuit diagrammatically illustrating a typical flip-flop employed in this invention.

In a counter such as counter 13, flip-flops of the type of FIG. 8 are electrically cascaded with the $\bar{Q}$ electrical output of the least significant flip-flop connected as electrical input to the $J_p$ and $K_p$ terminals of the next higher order flip-flop and so on through the chain. In such a circumstance each terminal +25 $vS$ is simultaneously controlled in a parallel type circuit by the contacts 14a and 14b of relay 14, so that upon energization of relay 14 each terminal +25 $vS$ on each flip-flop in the counter is made momentarily approximately 35 volts negative, whence, each flip-flop in the chain is set in its "1" representing electrical state. If the tape is conventionally provided with four digit representing positions in each of several successive transverse rows for dimensional information, then the tape distributor may apply these electrical signals from the tape to respective groups of four counter flip-flops, each such input being connected to the respective terminals $K_s$ wherein the presence of a hole in the tape results in the generation of a "1" representing electrical signal, that is, negative going signal, and the absence of a hole in the tape may represent a "0" electrical signal, that is, a positive signal. The application of a negative signal to the base of transistor Q11 at the terminal $K_s$ does not disturb the conducting condition of this transistor (the flip-flop now being in its "1" representing electrical state) whereas the application of the positive voltage to terminal $K_s$ represents a rise in base potential of transistor Q11, cutting off the base current, and results in switching of the flip-flop to its "0" representing electrical condition in which the output terminal Q rises from −2 volts to 0 volts.

The count of count representing signal pulses, such as signals $P_p$, with movement of the machine table, is effected by applying the input signals to the terminal $J_p$ and $K_p$ of the least significant flip-flop of the series. These signals which are positive going signals switching from −2 volts to about 0 volts, simultaneously pulse the bases of the transistors in the least significant stage flip-flop, and regardless of the electrical state of this flip-flop result in switching of this flip-flop to its other electrical state with each pulse occurrence. This switching of the least significant flip-flop between its two electrical states results in coupling of changing voltage state signals $\overline{Q}$ into the next higher order flip-flop in the counter and so on through the line to result in counting down of the counter from a particular configuration of flip-flop electrical states determined from input information at each terminal $K_s$, as read from the tape, until such time as a predetermined minimum count of the counter, including zero or some negative count, as may be required by a particular circuit, is reached, to thereby produce an output signal indicative of the machine table having reached the desired position.

As will be seen by reference to FIG. 3 the flip-flop FQL is controllable by separate input signals at terminals $J_p$ and $K_s$ through input signals provided by AND gate 11 at terminal $J_p$ under the control of signals $\overline{ML}$ and TSM, and through input signal TSB at terminal $K_s$. Here also a flip-flop setting signal is applied to initially set flip-flop FQL in its "1" representing electrical state, as described hereinabove, by means of contacts on relay 14.

The particular circuit whereby this separate input control may be accomplished is represented in FIG. 8. In this circuit, the AND gate 11 through which the input signals $\overline{ML}$ and TSM are combined as inputs to the terminal $J_p$ of the flip-flop, includes a pull-up resistor R30 and a pair of diodes D22 and D23, the negative voltage excursion at the cathode of diode D22 being clamped at −2 volts by means of a clamping diode D21. Signal $\overline{ML}$, which switches from −2 volts to 0 volts momentarily once each lead screw revolution, is applied to the cathode of diode D23 and signal TSM is applied to the cathode of diode D22. Signal TSM is negative when the switch TS is in its upper or cam actuated position, which corresponds to the position of the table in its retracted or reference position. At this time contacts TS1 of switch TS are closed connecting the cathode of diode D22 to −25 volts through a suitable resistor R31. The clamping diode D21 now clamps the cathode of diode D22 at −2 volts. Whenever, the machine table is moved out of its retract or reference position the limit switch TS is released and moves to the position shown, closing contacts TS2, in which case signal TSB switches from a positive value, determined in part by a bias network including resistor R32, to a negative value when terminal $K_s$ is connected to −25 volts through a suitable resistor R35.

With the flip-flop FQL in its "0" representing electrical condition, transistor Q12 conducting, a positive going voltage at the base relative to the emitter is needed, to cut off this transistor. Such a positive going signal is produced by AND gate 11 only when the signals at the cathodes of diodes D22 and D23 are high, in this case about 0 volts, the voltage change being 2 volts in a positive going direction from −2 volts in each instance. With terminal $J_n$ essentially at ground or 0 volts by reason of its connection through resistor R29 with the collector of transistor Q12, and terminal $J_p$ at −2 volts approximately, a 2 volt positive going voltage change at the output of AND gate 11, drives the base of transistor Q12 from 0 volts to about +2 volts, cutting off base current and switching off this transistor. The resulting negative excursion of collector voltage of transistor Q12, coupled with the now existing negative bias at the $K_s$ input to transistor Q11 by signal TSB, drives the base of transistor Q11 negative with respect to the emitter and switches on this transistor. Terminal Q is now about −2 volts and the flip-flop FQL is in its true or "1" representing electrical state. It will be understood that the circuits including AND gate 11, switch TS and the biasing network are used only on flip-flop FQL and are not employed in the counter 13.

Figure 9:
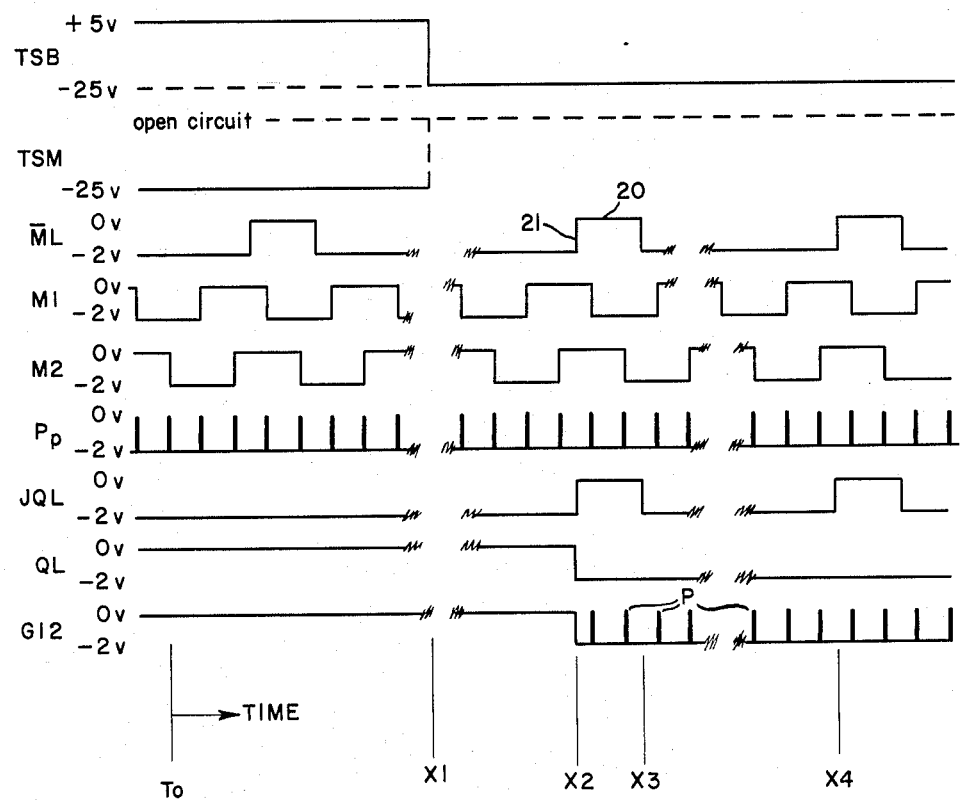
FIG. 9 is a system timing diagram.

FIG. 9 shows the relationship of all the electrical signals involved in pulse counting when proceeding in a positive direction of table movement. Typical voltage swings for each of the curves depicted are represented at the left ends of the curves. Time may be viewed in the direction of the arrow, so marked, pointing from left to right, time zero being arbitrarily chosen and represented as $T_o$ for the purpose of this discussion.

Assuming that the counter has been preset by introduction of the dimension signal to terminals $K_s$ of the counter flip-flops from the tape, and assuming that the table is in its retracted or reference position at $T_o$, in which latter condition terminal TS1 of the switch TS is closed, the voltage condition depicted by the various wave forms in FIG. 9 about time $T_o$ now exist.

Under these circumstances the signal TSB which appears on terminal $K_s$ is, say, at approximately +5 volts. Since contact TS1 is closed, the signal TSM is at some negative voltage, say of the order of −25 volts. At time $T_o$ the signal $\overline{ML}$ is also negative, being at −2 volts, but it will be observed that the signal $\overline{ML}$ periodically switches once each revolution from −2 volts to 0 volts. Although this signal appears on the input to the AND gate 11, the fact that the signal TSM at this time is not also high results in the output of the AND gate remaining at its lower voltage value, approximately −2 volts, as provided by clamping diode D21 under these circumstances. For these conditions the input to flip-flop terminal $J_p$ is about −2 volts and the input to flip-flop terminal $K_s$ (see FIGS. 3 and 8) is approximately +5 volts. These separate biasing voltages appearing on the bases of transistors Q12 and Q11, respectively, bias the flip-flop to its false or "0" representing electrical condition. With transistor Q12 conducting, terminal Q is therefore at about 0 volts, as represented by the signal QL in FIG. 9.

Figure 10:
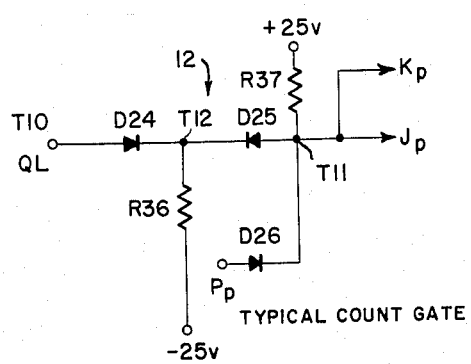
FIG. 10 is a detail illustration of a circuit gate employed herein.

Count gate 12 which is illustrated in detail in FIG. 10 is provided with an input terminal T10 which receives the electrical output QL of the flip-flop FQL. Terminal T10 is connected to the anode of diode D24 the cathode of which is connected to the cathode of a diode D25. The common cathodes of diodes D24 and D25 are connected to −25 volts through a pull down resistor R36. The anode of diode D25 which constitutes the output of this gate is connected at terminal T11 to the cathode of an input diode D26 which receives the incremental count pulses $P_p$ for example. The anode cathode terminal T11 of diodes D25 and D26 is connected through a pull up resistor R37 to a source of +25 volts. Terminal T11, the output terminal of this gate, is connected to both terminals $J_p$ and $K_p$ of the flip-flop.

As will be recalled, the positive pulses $P_p$ (see FIG. 9) switch between −2 volts and 0 volts. These are sharp voltage pulses of short duration. When signal QL is at 0 volts, terminal T12 tends to be maintained at a steady state voltage of about 0 volts. Thus the voltage state at terminal T11 is at least equal to or above that of the positive direction count pulses $P_p$ which back biases diode D26. Consequently the input signal on the $J_p$ and $K_p$ terminals of the counter is a steady state voltage of about 0 volts which is isolated from the transistor base by capacitor C8. Hence, the steady state voltage is not of a character to cause the flip-flop to change state.

Since the tape message has been completely read into the flip-flops it may be assumed that the motor control, FIG. 1, is operating the table motor and that the table is moving from its reference or retracted position. At time X1 cam 3 on the machine table releases limit switch TS. Contacts TS1 now open and contacts TS2 close. Signal TSM now changes in value being effectively open circuited. The cathode of diode D22 is now biased to a value of about +2 volts as determined by the voltage division provided by the IR drops of bias resistors R33 and R34 connected between +25 volts and ground. Thus a positive voltage is applied to the cathode of diode D22 which is one of the AND diodes in the AND gate 11. By reference to FIG. 9 it will be seen that the signal $\overline{ML}$ at this point is still at about −2 volts, the position at which the limit switch is released being chosen to be approximately centered between the positive going voltage excursions on the $\overline{ML}$ signal. With the next occurrence of a positive going voltage excursion of signal $\overline{ML}$, for instance, at 20, the second diode D23 of the AND gate is back-biased and the output voltage of the AND gate represented in signal JQL abruptly rises. This condition is designated at time X2 in FIG. 9. Voltage JQL is applied to the input terminal $J_p$ of flip-flop FQL. The voltage excursion at the output of the AND gate is about 2 volts in a positive direction, from −2 volts to 0 volts. As mentioned earlier, the coupling provided by capacitor C8 and the potential at which the associated plate of capacitor C8 is maintained by resistor R29 (approximately 0 volts) results in an excursion of base voltage at the base of transistor Q12 from about 0 volts to about +2 volts. This positive base bias tends to cut off the transistor Q12. However, at time X1, signal TSB is switched from about +5 volts to about −25 volts. This switch in signal voltage through the circuits provided is coupled to the base of transistor Q11 at terminal $K_s$ as shown, providing about a −4 volt bias on the base of this transistor. Thus, at the time that the output of AND gate 11 changed in a positive direction, biasing the base of transistor Q12 positively to cut this transistor off, a negative bias exists at the $K_s$ input allowing the base of transistor Q11 to be pulled negative thus initiating conduction of this latter transistor. The result is fast triggering of the flip-flop from its false or "0" representing electrical state to its true or "1" representing electrical state at time X2, whence, the output signal QL, as depicted in FIG. 9 at time X2, goes from 0 volts to −2 volts. By reference to FIG. 10 it will be seen that this drop in signal QL reduces the voltage negatively on the anode of input diode D24 of the count gate 12, FIG. 10. This pulls the output terminal T11 down to about −2 volts for the conditions indicated. The base voltage of the pulses $P_p$ is about −2 volts. This abrupt drop in output voltage in a negative going direction, although applied to the input terminals $J_p$ and $K_p$ of the first stage flip-flop of the counter, does not trigger this flip-flop inasmuch as the flip-flop responds only to positive going voltages above 0 volts. At this point, each count pulse $P_p$ now appearing at the output of the count gate, is applied as an input count at the $J_p$ and $K_p$ terminals of the first stage flip-flop of counter 13. Each positive going pulse now triggers the first stage flip-flop between its two electrical states, as described.

As earlier explained herein, the $\overline{Q}$ terminal of each flip-flop in the counter is connected as input to both the $J_p$ and $K_p$ terminals of the next higher order flip-flop. Whence each time a lower order flip-flop switches from −2 volts to 0 volts at its $\overline{Q}$ electrical terminal, that is, switches from false to true, a positive going voltage pulse is applied to both the $J_p$ and $K_p$ terminals of the next higher order flip-flop causing the next higher order flip-flop to change electrical state. By this expedient the counter is counted down from some preset electrical configuration as determined by the signals read from the tape.

When the signal $\overline{ML}$ goes to −2 volts at a time X3 and back to 0 volts at time X4 the electrical state of flip-flop FQL does not change. As described hereinabove, the negative going input signal does not trigger the flip-flop. The positive going signal being applied to terminal $J_p$ is ineffective since transistor Q12 is already cut off. Consequently flip-flop FQL remains on, terminal Q at −2 volts, until such time as the machine table is again moved to its reference or retracted or reference position in which position the signal TSM is switched back to about −25 volts.

The positive going portions of signal $\overline{ML}$ are positioned so that signal $\overline{ML}$ exists in its high level voltage state for at least a part of that period of time in which both signals M1 and M2 are in their high level voltage states, the edge 21 of this signal being selected so that the positive going voltage change occurs intermediate the respective intermittent count pulses $P_p$ which is during an interval when signals M1 and M2 are electrically stable. Such being the case a count is never lost since the circuits are set to initiate the counting of pulses in that brief interval of time intermediate the pulses, as will be seen by reference to the lower signal G12 illustrated in FIG. 9.

Although but one embodiment of this invention has been herein illustrated it will be appreciated that other arrangements of this invention may be devised without departing from the spirit and scope hereof. The selection of signals of positive or negative voltage states, the selection of true states of the flip-flop in either positive or negative voltage states, and the control of gating circuits by positive or negative voltage pulses or voltage state signals, are believed to be within the scope of those skilled in the art in developing the various circuits. Additionally, the invention is not limited as described hereinabove to particular types of transducers, electromagnetic and photosensitive types have been mentioned herein. Obviously photocells may be substituted for the photoresistive types of devices. Still further, where high orders of resolution or small scale increments are not required, mechanical types of switching devices actuated by projections on the rotary member 4 of the transducer may be employed. Additionally, lead screw 2 instead of being a machine tool table screw may be a lead screw carrying a nut in the transducer unit. With regard to the electrical input equipment it should be noted that any suitable input equipment may be used. Discrete signal devices such as telephone type dials or push button stations are obvious substitutes for tape readers. These and other equally obvious detail changes are believed to be within the capabilities of those skilled in the art. Accordingly, it is intended that the foregoing disclosure and the illustrations in the drawings shall be considered only as illustrative of the principles of this invention and not construed in a limiting sense.

What is claimed is:

1. An incremental position measuring system, comprising:
    drive means;
    a screw coupled to and rotated by said drive means;
    a member in threaded engagement with said screw for movement axially of said screw when said screw is rotated;
    incremental displacement detector means including a rotary transducer coupled to and rotated by said screw, for producing discrete electrical signals with each predetermined angular increment of displacement of said screw and for producing a separate electrical signal once each revolution of said screw;
    switch means disposed in the path of movement of said member and operated thereby to produce a switch signal when said member is in a predetermined position;
    circuit means coupled to said switch means and to said incremental displacement detector means and responsive to said switch signal and said separate electrical signal for producing a control signal;
    and counter means coupled to said circuit means and to said incremental displacement detector means to count said discrete electrical signals under the control of said control signal.

2. An incremental positioning system comprising:
    drive means;
    a screw coupled to and rotated by said drive means;

a member in threaded engagement with said screw for movement axially of said screw when said screw is rotated;

incremental displacement detector means including a rotary transducer having a rotatable member coupled to and rotated by said screw, for producing discrete electrical signals with each predetermined angular increment of displacement of said screw and for producing a separate electrical signal once each revolution of said screw;

switch means disposed in the path of movement of said member and operated thereby to produce a switch signal when said member is in a predetermined position;

a drive control circuit connected to and controlling said drive means;

a counter having an output circuit coupled to and controlling said drive control circuit;

means coupled to said counter for setting said counter to a predetermined count;

a counter control circuit coupled to said incremental displacement detector means, for receiving said discrete electrical signals and having an output circuit coupled to said counter for operating said counter;

and circuit means coupled to said switch means and to said incremental displacement detector means to receive said switch signal and said separate electrical signal and having an output circuit coupled to and controlling said counter control circuit.

3. An incremental displacement detector comprising:
a rotor having a scale thereon;
a screw connected with said rotor;
a displaceable member in threaded engagement with said screw;
a pair of electrical detectors coupled to and controlled by said scale and producing phase displaced electrical signals, only one signal changing at a time when said rotor rotates and said signals existing in the same electrical state for an interval of time;
a single electrical detector coupled to and controlled by said rotor and producing a single signal once each revolution of said rotor during one of said intervals of time;
and electrical means coupled to and controlled by said displaceable member and producing an electrical signal when said displaceable member is in a predetermined position along said screw.

4. An incremental displacement detector comprising:
a transducer having a rotor and three output circuits controlled by said rotor, two of said output circuits producing electrical increment signals which change, one at a time, between two voltage levels during predetermined increments of rotation of said rotor, the third of said output circuits producing a third signal which occurs once each revolution of said rotor at a time when said electrical increment signals are each at one of their two voltage levels;
a displaceable member coupled to said rotor and displaceable along a path in proportion to angular displacement of said rotor;
and reference signal producing means coupled to and controlled by said displaceable member and producing a reference signal at a different time than said third signal.

5. An incremental position measuring system comprising:
a transducer having a rotatable member and three output circuits controlled by rotation of said rotatable member, two of said output circuits producing electrical increment signals which change, one at a time, between two voltage levels during predetermined increments of angular displacement of said rotatable member, the third of said output circuits producing a rotation signal which occurs once each revolution of said rotatable member at a time when said increment signals are each at one of their two voltage levels;
a displaceable member coupled to said rotatable member and displaced along a path in proportion to angular displacement of said rotatable member;
reference signal producing means coupled to and controlled by said displaceable member;
circuit means coupled to said two output circuits of said transducer and controlled by said increment signals for producing a series of discrete signals when said rotatable member is rotated;
signal counting means, including a counter coupled to said circuit means and receiving said discrete signals;
and means having input circuits coupled to said reference signal producing means and to said third output circuit of said transducer and having an output circuit coupled to said signal counting means for controlling counting of said series of discrete signals.

References Cited by the Examiner
UNITED STATES PATENTS

| | | | |
|---|---|---|---|
| 2,597,866 | 5/1952 | Gridley | 340—204 |
| 2,623,936 | 12/1952 | Kennedy | 340—203 |
| 2,770,798 | 11/1956 | Roth | 340—203 |
| 2,785,353 | 3/1957 | Fenemore | 340—203 |
| 3,024,986 | 3/1962 | Stiranese | 235—92 |
| 3,056,956 | 10/1962 | Retzinger. | |

NEIL C. READ, *Primary Examiner.*

L. MILLER ANDRUS, THOMAS B. HABECKER,
*Examiners.*